April 26, 1955      F. W. BECKER      2,706,950

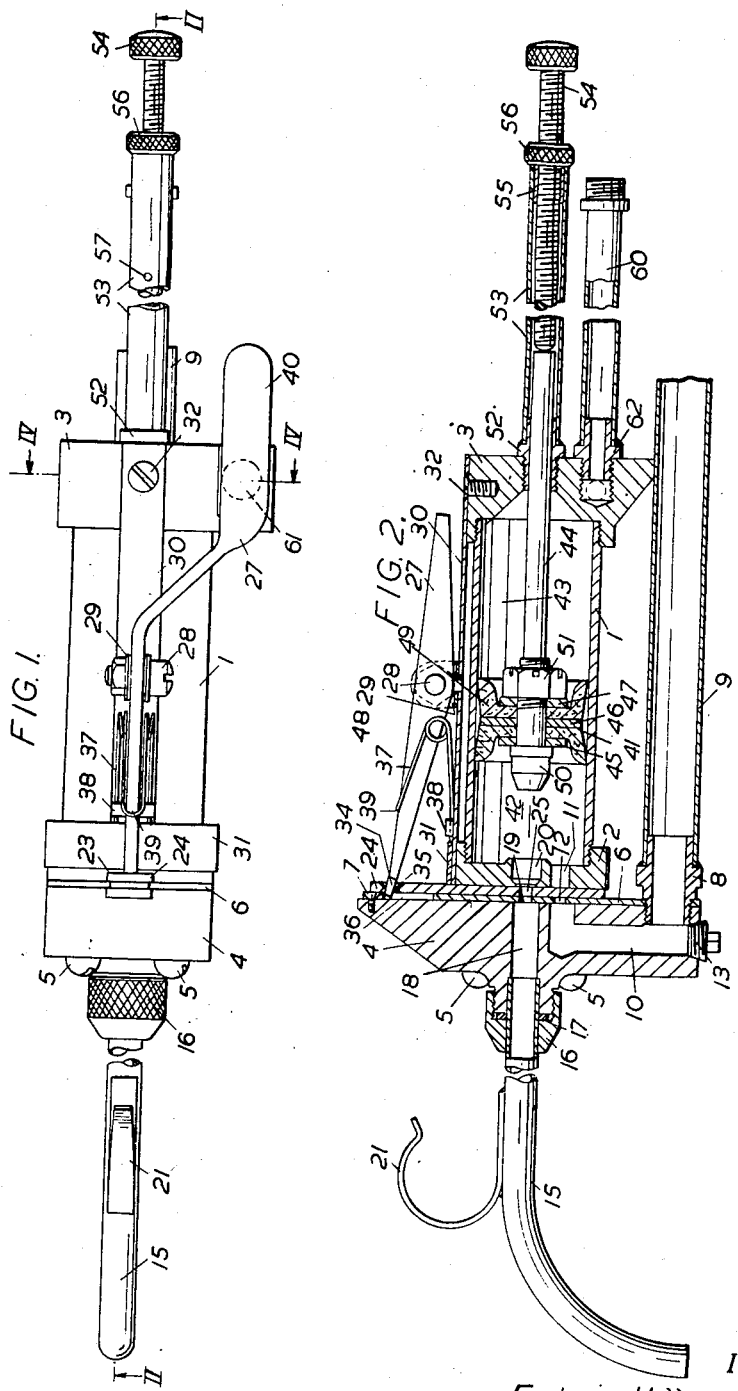

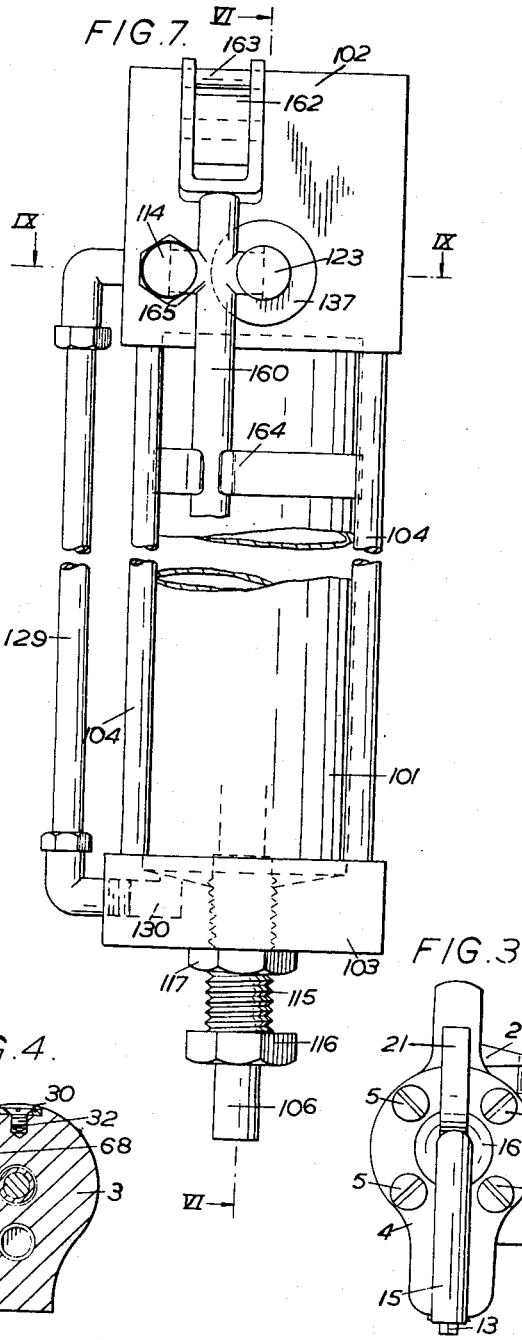

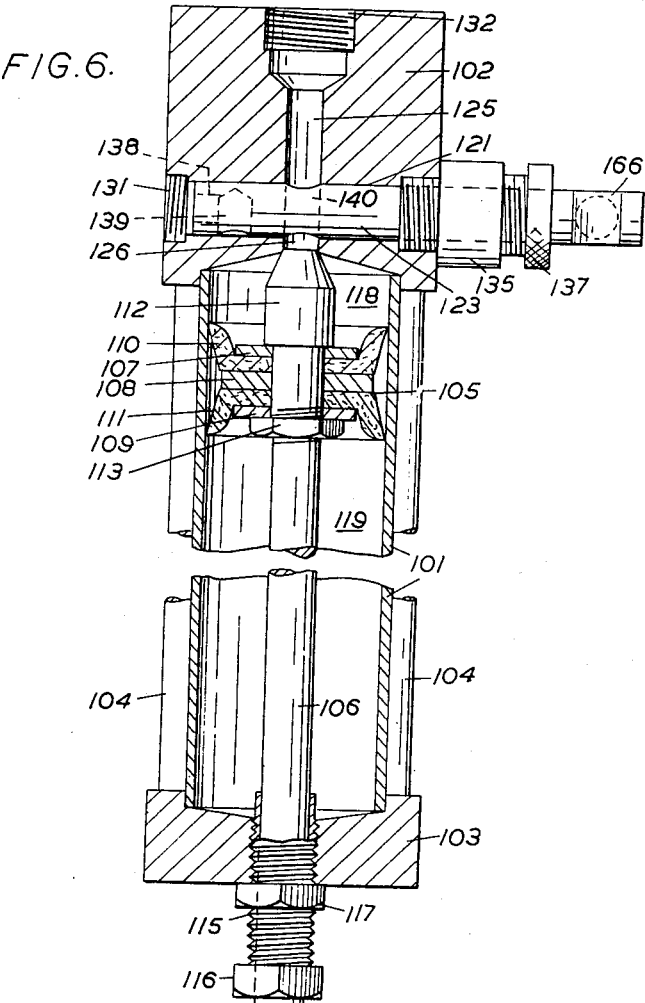
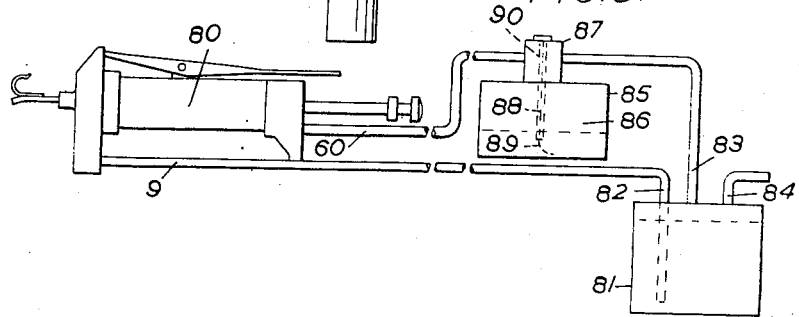

APPARATUS FOR DELIVERING MEASURED QUANTITIES OF SUBSTANCES

Filed Oct. 14, 1949      4 Sheets-Sheet 4

Inventor
Frederick William Becker

By Richard Gein
Attorneys

United States Patent Office 2,706,950
Patented Apr. 26, 1955

2,706,950

APPARATUS FOR DELIVERING MEASURED QUANTITIES OF SUBSTANCES

Frederick William Becker, Wembley, England

Application October 14, 1949, Serial No. 121,381

5 Claims. (Cl. 103—38)

This invention relates to an apparatus for delivering or dispensing measured quantities of a substance and has for one of its principal objects the provision of a novel apparatus for delivering liquid, semi-liquid or paste-like substances of various kinds. A more specific object of the invention is the provision of apparatus for delivering exact quantities of such substances, measured by volume.

A further object of the invention is the provision of apparatus for the above purpose which includes means whereby the quantity of substance delivered at each operation of the apparatus may be accurately adjusted.

Yet another object of the invention is the provision of an apparatus of the described type which is of convenient form and which is rapid and clean in operation.

A still further object of the invention is the provision in such apparatus of improved means for supplying the substance to be delivered and also for supplying a pressure operating fluid for operating the apparatus.

Another object of the invention is the provision of improved means for lubricating the moving parts of the apparatus.

Further objects and features of the invention will become apparent from the following description when taken in conjunction with the accompanying drawings.

For the better understanding of the invention various embodiments thereof will now be described, by way of example. Reference will be had to the accompanying drawings, in which:

Figure 1 is a plan view of a portable device which is particularly intended for introducing fillings into cakes, tarts and other confectionery;

Figure 2 is a vertical sectional view of the device shown in Figure 1, taken on the line II—II;

Figure 3 is a front end view of the device shown in Figures 1 and 2;

Figure 4 is a transverse section taken on the line IV—IV of Figure 1;

Figure 5 shows diagrammatically an arrangement for supplying the substance to be delivered and also the operating fluid to the device of Figures 1 to 4 and also illustrates diagrammatically a method of lubricating the piston of the device;

Figure 6 is a vertical sectional view of another form of device according to the invention, taken on the line VI—VI of Figure 7;

Figure 7 is a front elevational view of the device shown in Figure 6;

Figure 8:
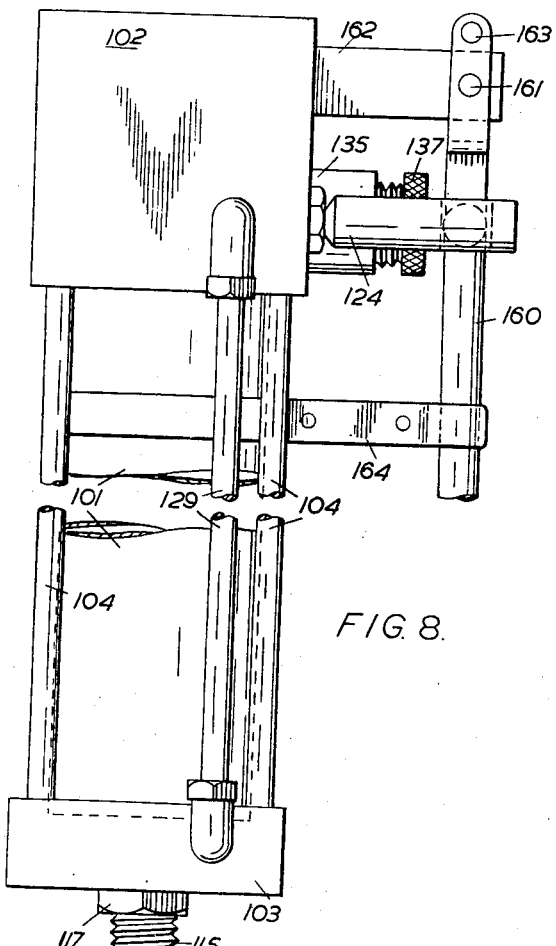
Figure 8 is a side elevational view of the device shown in Figures 6 and 7.

Referring first to Figures 1 to 4, the device comprises a tubular cylinder 1 which is provided at its front end with a front boss 2 and at its rear end with a rear boss 3. These bosses are screwed on to the ends of the cylinder 1.

A cylinder head 4 is attached to the front of the boss 2 by means of screws 5 with the interposition of a thin ported valve plate 6. This plate 6 is fixed in position on the cylinder head 4 by means of a screw 7 at the top and by means of a nipple 8 at the bottom. This nipple 8 is screwed into the cylinder head and provides an attachment for a pipe 9 through which the filling substance is supplied to the device. The pipe 9 is connected with the interior of the cylinder 1 by passages 10 and 11 formed in the head 4 and boss 2 respectively and by a registering port 12 formed in the valve plate 6. The outer end of the passage 10 is closed by a plug 13 which can be removed for cleaning.

The cylinder head 4 is provided with a delivery nozzle or pipe 15 through which the filling substance is discharged from the device. This delivery nozzle is attached to the cylinder head by means of a nut 16 within which is fitted a packing washer 17 to provide a fluid-tight seal. It communicates with the interior of the cylinder 1 through a passage 18 in the head 4, through a port 19 which is formed in the valve plate 6, and through a passage 20 in the boss 2.

A hook 21 is provided on the nozzle 15 and enables the device to be hung up when not in use.

The boss 2 is formed in its front face with a vertical slot 23 within which is fitted a slide valve 24. This valve is formed with a single port 25 which registers with the port 19 when the valve 24 is raised (as shown in Figure 2) and registers with the port 12 when the valve is in its lower (and normal) position. Thus, when the slide valve 24 is moved downwardly it allows the filling substance from the pipe 9 to enter the cylinder 1, while when it is in its upper position it cuts off the supply of the substance to the cylinder but allows the substance already in the cylinder to be discharged from it through the delivery nozzle 15. It should be noted that the dimensions and positions of the ports 12, 19 and 25 are such that the port 12 is completely closed before the port 19 is uncovered.

The slide valve 24 is operated by means of a valve operating lever 27 which is pivotally mounted by means of a bolt 28 on a bracket 29 which is fitted on a lever support plate 30. This plate 30 fits in grooves formed in the upper surfaces of the bosses 2 and 3. It is attached to the boss 2 by means of a ring 31, which is a tight fit over the boss, and it is attached to the boss 3 by means of a screw 32. The plate 30 thus serves not only to support the operating lever 27 but also to prevent the unscrewing of the bosses 2 and 3 from the cylinder 1.

The tip 34 of the lever 27 engages in a bevelled hole 35 formed in the valve plate 24, while it also extends into a vertical slot 36 formed in the fixed plate 6. The lever 27 thus serves to operate the valve 24, while the movement of the latter is limited by the length of the slot 36.

A spring 37, the ends of which are attached at 38 to the plate 30 and the central loop 39 of which engages the top of the front end of the lever 27, urges the valve 24 into its lower position in which it connects the pipe 9 with the cylinder 1. By pressing on the rear end 40 of the lever 27, however, the valve 24 can be raised into the position shown in the drawings in which it connects the cylinder with the delivery nozzle 15. The two positions of the valve 24 are defined by the engagement of the tip 34 of the lever 27 against the ends of the slot 36.

A piston, indicated generally at 41, is mounted in the cylinder 1 the interior of which it divides into two chambers, a front displacement chamber 42 and a rear operating chamber 43. The piston, which is mounted on the end of a piston rod 44, comprises three metal washers 45, 46 and 47 and two rubber or leather cups 48 and 49 which are clamped between the metal washers, the whole assembly being held between a piston head 50 and a nut 51, which is screwed on the piston rod.

The piston rod 44 projects rearwardly through the boss 3, being slidable in a nut 52 which is screwed into the boss. A tube 53, which is welded or otherwise attached to the nut 52, surrounds the end of the piston rod and supports a stop screw 54 which is threaded in a sleeve or cap 55 fitted in the end of the tube 53. The stop screw 54 serves to limit the rearward movement of the piston rod 44 and thus of the piston 41. The forward movement of the piston is limited by the piston head 50 engaging the boss 2. By adjusting the screw 54 inwardly or outwardly the stroke of the piston 41 can be varied. This enables the quantity of the substance which is discharged at each operation of the device to be varied as required.

A locknut 56 is provided to enable the screw 54 to be locked in the adjusted position while the tube 53 may be formed with an air vent 57 to allow the free movement of the piston rod.

Compressed air is supplied to the operating chamber 43 behind the piston 41 from an air pipe 60 under the control of an air valve 61 (see particularly Figure 4). The air pipe 60, which is attached to a nipple 62 screwed into the boss 3, communicates with a transverse passage 63 in the boss, the outer end of which passage is closed by means of a screwed plug 64. This passage 63 opens into the lower end of a vertical passage 65 in which the valve 61 operates, this valve being slidably mounted in a bushing 66 and a valve seat 67 which are fixed in the passage 65 in any suitable manner. The passage 65 between the bushing 66 and seat 67 is connected with the rear end of the cylinder 1 by means of a passage 68 formed in the boss 3.

The valve member 61 is formed with an axial bore 69 which is drilled in from its lower end and which connects two transverse ports 70 and 71 which are formed in the valve. A ball valve 72 is mounted in the lower end of the passage 65 and is normally held against the seat 67 by the pressure of the air supplied by the pipe 60. When, however, the end 40 of the operating lever 27 is depressed it engages and depresses the valve member 61 which forces the ball 72 off its seat 67. This allows the air to flow from the air pipe 60 to the cylinder through the port 70, bore 69, port 71 and passage 68.

When pressure on the lever 27 is released the air pressure forces the ball 72 and the valve member 61 upwardly, thus cutting off the supply of air to the cylinder. The upward movement of the valve member 61 causes the lower port 70 to connect with the passage 68 while the upper port 71 is exposed above the top of the bushing 66. This provides an outlet passage through which the air in the operating chamber is discharged to atmosphere.

The operation of the device is as follows: The pipe 9, which may itself be flexible or which may be connected to a flexible hose, is supplied with the filling substance which is delivered under pressure from a suitable container. The air pipe 60 is connected by a flexible hose to any suitable source of compressed air of the required pressure.

When no pressure is applied to the lever 27 the spring 37 causes it to hold the valve 24 in its lower position, while the air valve 61, including the ball valve 72, is held in its upper closed position by the pressure of the air. Consequently, the pressure of the filling substance causes it to enter the displacement chamber 42 while displacing the piston 41 and rod 44 rearwardly until the end of the rod 44 abuts against the end of the screw 54.

In order to discharge the filling substance from the displacement chamber the lever 27 is operated to raise the valve 24. This movement of the valve first closes the port 12 and then opens the port 19.

After the lever 27 and valve 24 have moved sufficiently to close the port 12 the lever engages the upper end of the air valve 61 which it depresses, thus pressing the ball 72 off its seat. As a result air is admitted under pressure to the operating chamber 43 forcing the piston 41 forwardly and discharging the substance from the chamber 42 through the nozzle 15. The forward movement of the piston is limited by the engagement of the head 50 against the boss 2, it being noted that the tapered end portion of the head 50 then enters the mouth of the passage 20 with which it forms a substantially liquid-tight seal. This minimizes the risk of any further quantity of the substance being discharged from the displacement chamber should the pressure air manage to leak past the piston 41 from the operating chamber.

When the lever 27 is released the air valve is allowed to close while the slide valve 24 is moved downwardly so as first to close the port 19 and subsequently to open the port 12, whereupon a fresh charge of the substance enters the chamber 42, again forcing back the piston 41 until its movement is limited by the stop screw 54.

It will be seen that by means of the device accurately measured quantities of the filling substance can be discharged from the nozzle 15. The device can be operated very rapidly at a rate which may exceed twice a second. The quantity of the substance which is discharged at each operation may be adjusted by means of the screw 54. If desired a suitably calibrated scale may be provided.

Figure 5 illustrates diagrammatically one arrangement for supplying the substance and the compressed air to the device shown in Figures 1 to 4, while it also illustrates a method of ensuring that the piston is adequately lubricated.

In Figure 5 the device which has been described with reference to Figures 1 to 4 is indicated generally at 80. The substance to be dispensed is contained in a closed vessel 81. Preferably the substance is contained in an open-topped tank which is removably fitted in the vessel 81 so that it can easily be removed for cleaning or for replacement by another container tank, when required.

The vessel 81 is provided with a removable air-tight lid which carries three connections 82, 83 and 84. The connection 82 extends almost to the bottom of the vessel 81 and serves for the supply of the substance from the vessel to the supply pipe 9 of the device. The substance is delivered through the outlet 82 under pressure produced by means of compressed air which is supplied to the vessel 81 through the connection 84.

The connection 83 connects the top of the vessel 81 with the air inlet pipe 60 and in this way the device is kept supplied both with the substance and also with air under a suitable pressure for operating the device.

When the apparatus is used for delivering non-oily substances it may be necessary to provide means for lubricating the piston 41 and piston rod 44 (Figure 2). For this purpose an oiling device which is indicated generally at 85 may be provided in the air supply line between the vessel 81 and the pipe 60.

This device 85, which is indicated purely diagrammatically in Figure 5, comprises an oil reservoir 86 which is provided with an upper extension or dome 87 through which the air passes on its way to the device 80. An open-ended tube 88 containing a wick 89 extends downwardly from the dome 87 and dips into the oil in the reservoir 86. At its upper end the tube 88 is formed with a number of perforations such as 90 through which the surface of the wick 89 is exposed to the air passing through the dome 87. Thus, this air picks up a very small quantity of oil vapour which is just sufficient to ensure adequate lubrication of the piston and piston rod and also of the air inlet valve 61 (Figure 4) but which is not sufficient to contaminate the substance being delivered by the device. This is particularly important in the case of foodstuffs.

Figures 6 to 9 show another form of device constructed in accordance with the invention. This device comprises a cylinder 101 which is closed at its upper end by means of a square cylinder head 102 and which is closed at its lower end by means of a lower boss 103, also of square section. The head 102 and the boss 103 are connected together at their corners by means of four rods 104 which secure them in position on the ends of the cylinder 101. The rods 104 may be tapped into the parts 102 and 103 or they may be secured to the latter by nuts or other suitable means.

A piston 105 is provided within the cylinder 101, mounted on a piston rod 106. This piston 105 is constructed in a similar manner to the piston 41 of the apparatus of Figures 1 to 4 and comprises three metal washers 107, 108 and 109 between which are fitted two rubber or leather cups 110 and 111. This assembly is clamped between a piston head 112 and a nut 113, which latter is screwed on a threaded portion of the rod 106.

The lower boss 103 is formed with an axial tapped opening in which is fitted an externally threaded sleeve 115. The piston rod 106 passes slidably through this sleeve.

The sleeve 115 extends into the interior of the cylinder 101 and its end is adapted to be engaged by the nut 113 to limit the downward movement of the piston 105. The sleeve 115 can be screwed inwardly or outwardly, for which purpose it is provided with an hexagonal head 116, and in this way the downward stroke of the piston 105 can be adjusted as desired. The sleeve 115 can be locked in its adjusted position by means of a lock-nut 117.

The upward movement of the piston and piston rod is limited by the engagement of the piston head 112 against the cylinder head 102.

It will be noted that, as in the case of the previous construction, the piston 105 divides the interior of the cylinder 101 into two chambers, namely an upper displacement chamber 118 and a lower operating chamber 119.

The cylinder head 102 is formed with two transverse bores 121 and 122 extending through it, in which are fitted, respectively, a slide valve 123, controlling the supply and delivery of the substance to the displacement chamber 118, and an air control valve 124 controlling the admission and discharge of pressure air from the operating chamber 119. The head 102 is also formed with a vertical bore 125, 126 which intersects the bore 121 and with a side passage 127 which opens into the enlarged end 128 of the bore 122 and which is connected with the lower end of the operating chamber 119 by means of an external air pipe 129 and a suitable passage 130 formed in the lower boss 103.

The substance to be delivered is supplied under pressure to the end 131 of the bore 121, while it is delivered from the apparatus from the upper end 132 of the vertical bore 125. The pressure air is supplied to the enlarged end 133 of the bore 122. The ends of these bores 121, 122 and 125 are tapped as shown in order to receive the appropriate connections.

The device may be connected to the apparatus supplying the substance to be delivered and to the compressed air supply in any of a number of ways but it is particularly suitable for mounting on the side of a close vessel or tank containing the substance which is subjected in the tank to the pressure of the air in a similar manner to that which has been described with reference to Figure 5. Thus, the supply inlet 131 can be connected to the end of a pipe leading to the bottom of the tank containing the substance while the air inlet 133 can be connected to the upper part of this tank or, alternatively, it could be connected directly to an air supply pipe. For conveying the substance delivered from the apparatus a flexible or other delivery pipe is connected to the delivery outlet 132.

Figure 9:
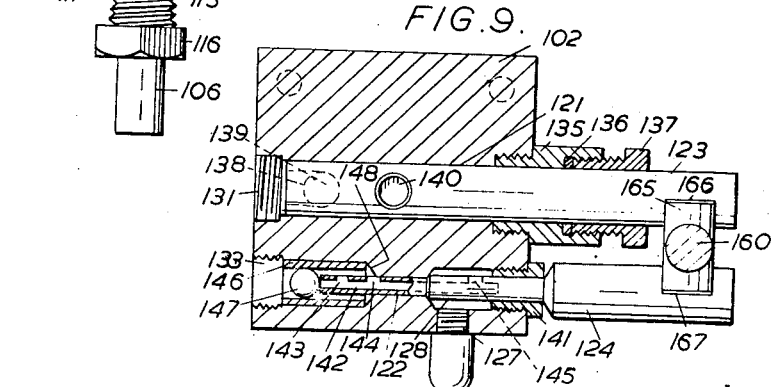
Figure 9 is a transverse section taken on the line IX—IX of Figure 7.

As is best shown in Figures 6 and 9 the valve 123 passes through a bushing 135 in which is fitted a packing 136 held in place by a gland nut 137. At its inner end the valve 123 is drilled with an axial passage 138 which opens into a downwardly directed transverse port 139. The valve 123 is also formed with a second transverse port 140 which extends completely through it.

When the valve 123 is in its inner position, as shown in the drawings, the port 140 is in line with the vertical bore 125, 126 in the head 102 and thus connects the displacement chamber 118 with the outlet 132. When, however, the valve 123 is drawn outwardly (which is to the right as viewed in Figures 6 and 9) the port 139 registers with the passage 126 and thus allows the substance supplied to the inlet 131 to pass through the passage 126 into the chamber 118. Communication between the chamber 118 and the delivery outlet 132 is then cut off by the valve.

The air valve 124 (Figure 9) is slidably mounted in a bushing 141 and it is also a good sliding fit in the central narrower section of the bore 122. The valve 124, which is of stepped form as shown, is formed with an axial bore 142 opening from its inner end, while three transverse ports 143, 144 and 145 are formed opening into this bore in the positions shown in the drawings.

A sleeve 146 is fitted in the enlarged end 133 of the bore 122 and receives a ball valve 147. This ball 147 is a loose fit in the sleeve 146 and it is adapted to seat against the inner end 148 of the enlarged bore 133 when the valve member 124 is drawn outwardly (to the right in Figure 9).

When the valve member 124 is in its inner position, as shown in Figure 9, the ball valve 147 is held off its seat 148 and the air supplied to the inlet 133 can pass through the ports 143 and 144 into the bore 142 whence it passes through the port 145 into the other enlarged end 128 of the bore 122. It then passes through the passage 127, air pipe 129 and passage 130 into the operating chamber 119 below the piston 105.

When the valve member 124 is drawn outwardly (to the right in Figure 9), the ball valve 147 is allowed to engage the seat 148, which it does under the action of the air pressure, thus cutting off the supply of the air to the operating chamber. Furthermore, the movement of the valve member 124 causes the port 144 to open into the enlarged end 128 of the bore 122 while the port 145 is opened to atmosphere outside the bushing 141. In this way an air outlet passage is provided through which the air from the operating chamber 119 can escape to atmosphere.

The valves 123 and 124 are operated simultaneously by means of an operating lever 160 which is pivotally mounted at 161 on a pivot post 162 projecting from the front face of the cylinder head 102. A transverse pin 163 provided in the upper forked end of the lever 160 is adapted to engage the top surface of the post 162 to limit the outward movement of the lever 160. This lever is adapted to be held in its inner position (as shown) by means of a spring clip 164 which is mounted on the cylinder 101.

The lever 160 operates the valves 123 and 124 through a cross bar 165 which engages in recesses 166 and 167 formed in the valves 123 and 124 respectively. When the lever 160 is in the inner position, in which it is engaged by the clip 164, the valves 123 and 124 are in their inner positions, as shown. In these positions the valve 123 connects the displacement chamber 118 with the delivery passage 125 and outlet 132, while the air valve 124 allows the compressed air to be delivered to the operating chamber 119, thus forcing the piston 105 to the upper end of the cylinder 101. This is the normal position of the apparatus and ensures as far as possible that any leakages which may occur will be air leakages and not leakages of the substance to be delivered.

To operate the device the operating lever 160 is drawn outwardly away from the clip 164. This causes the valve member 123 first to close the delivery passage 125 and then to open the connection between the supply inlet 131 and the displacement chamber 118, which it does through the bore 138, port 139 and bore 126.

At the same time the air valve is moved so as to allow the ball valve 147 to engage the seat 148 to cut off the air supply, while an air outlet is provided for the air in the chamber 119 through the ports 144 and 145. Consequently, the substance is allowed to enter the displacement chamber 118, thus forcing the piston 105 down until its movement is limited by the engagement of the nut 113 against the end of the stop sleeve 115.

When the lever 160 is returned to its previous position the connections for the substance and for the compressed air are reversed, thus allowing the air to enter the operating chamber 119 to force the piston upwardly in the cylinder 101 to discharge the substance contained in the chamber 118 through the delivery passage 125 to the place of use.

It will be obvious that many modifications are possible in the apparatus which has been described. Thus, the stop sleeve 115 of the device of Figures 6 to 9 could be used in the device of Figures 1 to 4, in place of the stop screw 54, and vice versa. Furthermore, an oiling device such as 85 could, if necessary, be used with the device shown in Figures 6 to 9.

Also, any of the devices of the invention could be attached to or could be constructed as parts of machines or of other apparatus of various kinds. Thus, either of the devices illustrated could be mounted above or adjacent to a conveyor or rotary table on which a number of objects, such as confections, are conveyed past the device for the reception of a filling substance.

In this as well as in many other applications of the invention, automatic means may be provided for operating the control member or lever. For example, the control lever 27 or 60 could be so arranged as to be engaged and operated by a cam or by a series of cam elements mounted on or associated with the table or conveyor.

It will be noted that in all the constructions described both the supply of the air to the operating chamber and its discharge therefrom are controlled by double-acting valves. It would, however, be possible to use a single-acting valve controlling only the admission of the air, if so desired. This could be done by providing a permanent restricted air outlet leading from the operating chamber to atmosphere. This restricted outlet would not prevent sufficient pressure from building up in the operating chamber to operate the apparatus but it would be sufficient to allow the return movement of the piston to take place when the air supply is cut off.

The use of double acting air valves is, however, to be preferred since it economises in the consumption of compressed air and enables the device to be operated more rapidly.

The substance to be delivered can of course be supplied to the device by means not involving the use of compressed air or other fluid. For example, the substance can be supplied under the required pressure by means of a pump of any suitable type.

I claim:

1. An apparatus for delivering quantities of a liquid or a semi-liquid substance, comprising a cylinder, a piston having a discharge stroke and a return stroke within the cylinder and dividing the interior thereof into an operating chamber and a displacement chamber, said cylinder having supply and delivery passages for the admission and delivery of said substance to and from the displacement chamber and inlet and outlet passages for the admission and delivery of a pressure operating fluid to and from the operating chamber, said piston having a tapered head end, the mouth of the delivery passage leading to the displacement chamber being located opposite the tapered head end and being adapted to receive said end, a slide valve reciprocally mounted in said cylinder for controlling the supply and delivery passages for the substance, said valve closing the supply passage for the substance before it begins to open the delivery passage for the substance, a valve mounted in said cylinder for controlling the admission and delivery of the pressure operating fluid, and a single lever pivotally mounted upon said cylinder and operatively connected with both valves, the two valves operating to allow the substance to enter the displacement chamber while causing the piston to carry out its return stroke and to allow the pressure operating fluid to cause the piston to carry out its discharge stroke to discharge the substance from the displacement chamber, the tapered head end of the piston closing the mouth of the delivery passage for the substance at the end of the discharge stroke.

2. An apparatus for delivering quantities of a liquid or a semi-liquid substance, comprising a cylinder, a front cylinder head and a rear cylinder head on opposite ends of said cylinder, a piston having a discharge stroke and a return stroke within the cylinder and dividing the interior thereof into an operating chamber on the side of the rear cylinder head and a displacement chamber on the side of the front cylinder head, adjustable means varying the return stroke of the piston towards the rear cylinder head, said front cylinder head having supply and delivery passages for the admission and delivery of said substance to and from the displacement chamber and said rear cylinder head having inlet and outlet passages for the admission and delivery of a pressure operating fluid to and from the operating chamber, a slide valve reciprocally mounted in said front cylinder head and having a single port for controlling the supply and delivery passages for the substance, a valve mounted in said rear cylinder head for controlling the admission and delivery of the pressure operating fluid, and a single two-armed lever pivotally mounted upon said cylinder and having one arm operatively connected with the first-mentioned valve and another arm operatively connected with the second-mentioned valve, and spring tension means engaging said lever for maintaining the single port of the first-mentioned valve in registry with the delivery passage for said substance when the second-mentioned valve opens the inlet passage for the pressure operating fluid, said lever simultaneously moving the single port of the first-mentioned valve into registry with the supply passage and against the action of said spring tension means and causing the second-mentioned valve to close the inlet passage to the fluid.

3. An apparatus for delivering quantities of a liquid or a semi-liquid substance, comprising a cylinder, a front cylinder head and a rear cylinder head on opposite ends of said cylinder, a piston having a discharge stroke and a return stroke within the cylinder and dividing the interior thereof into an operating chamber on the side of the rear cylinder head and a displacement chamber on the side of the front cylinder head, adjustable means varying the return stroke of the piston towards the rear cylinder head, said front cylinder head having supply and delivery passages for the admission and delivery of said substance to and from the displacement chamber and said rear cylinder head having inlet and outlet passages for the admission and delivery of a pressure operating fluid to and from the operating chamber, a slide valve reciprocally mounted in said front cylinder head and having a single port for controlling the supply and delivery passages for the substance, a valve mounted in said rear cylinder head for controlling the admission and delivery of the pressure operating fluid, and a single two-armed lever pivotally mounted upon said cylinder and having one arm operatively connected with the first-mentioned valve and another arm operatively connected with the second-mentioned valve, said lever causing the first-mentioned valve to close the supply passage and to open the delivery passage for the substance while causing the second-mentioned valve to open the inlet passage and to close the outlet passage for the pressure operating fluid, and to cause the first-mentioned valve to open the supply passage and to close the delivery passage for the substance while causing the second-mentioned valve to close the inlet passage and to open the outlet passage for the pressure operating fluid.

4. Apparatus in accordance with claim 3, in which the piston substantially seals the supply and delivery passages at the end of its discharge stroke and when in juxtaposition with the front cylinder head.

5. Apparatus for delivering measured quantities of a liquid or semi-liquid substance in combination with a pressure operating fluid, the apparatus comprising a cylinder, end members closing the opposite ends of the cylinder, a piston reciprocable within the cylinder and dividing the interior thereof into an operating chamber and a displacement chamber, means for limiting the movement of the piston in opposite directions, a supply and a delivery passage for the admission of the substance to and the delivery thereof from the displacement chamber in one of the end members, the passages communicating with the displacement chamber, inlet and outlet passages for the admission of the pressure operating fluid into and for the discharge thereof from the operating chamber formed in the other of the end members and communicating with the operating chamber, a double-acting valve with single port slidable in the first end member and controlling the supply and delivery passages, a second double-acting valve slidable in the other end member and controlling the inlet and outlet passages for the pressure operating fluid, and a single operating lever moving the single port of the first-mentioned valve to close the inlet passage and to open the outlet passage of the displacement chamber while opening the inlet passage of the second-mentioned valve and closing the outer passage thereof for the admission of the fluid into the operating chamber and to close the outlet passage and to open the inlet passage of the displacement chamber while closing the inlet passage of the second-mentioned valve and opening the outlet passage thereof for the release of the fluid in the operating chamber.

References Cited in the file of this patent

UNITED STATES PATENTS

| | | |
|---|---|---|
| 1,513,962 | Callahan et al. | Nov. 4, 1924 |
| 1,931,894 | Gill | Oct. 24, 1933 |
| 1,949,497 | Stafford et al. | Mar. 6, 1934 |
| 2,004,664 | Krannak | June 11, 1935 |
| 2,148,767 | McGlade | Feb. 28, 1939 |
| 2,463,113 | Klein | Mar. 1, 1949 |
| 2,501,004 | Reese | Mar. 21, 1950 |